US006816341B2

(12) United States Patent
Matsumoto et al.

(10) Patent No.: US 6,816,341 B2
(45) Date of Patent: Nov. 9, 2004

(54) HARD DISK DRIVE UTILIZING SECOND LUBRICANT OVER A FIRST LUBRICANT HAVING A PHOSOPHEZINE GROUP

(75) Inventors: Hiroyuki Matsumoto, Chigasaki (JP); Hiroshi Tani, Ninomiya (JP); Mitsuhiro Shoda, Odawara (JP); Koji Sonoda, Oume (JP); Takayuki Nakakawaji, Kitaibaraki (JP); Mina Amo, Hitachi (JP); Yutaka Ito, Takahagi (JP)

(73) Assignee: Hitachi, Ltd., Tokyo (JP)

( * ) Notice: Subject to any disclaimer, the term of this patent is extended or adjusted under 35 U.S.C. 154(b) by 98 days.

(21) Appl. No.: 10/347,912

(22) Filed: Jan. 22, 2003

(65) Prior Publication Data

US 2003/0179490 A1 Sep. 25, 2003

Related U.S. Application Data

(63) Continuation-in-part of application No. 09/897,401, filed on Jul. 3, 2001, now Pat. No. 6,665,147.

(30) Foreign Application Priority Data

Jul. 5, 2000 (JP) ..................................... 2000-208228
Jan. 22, 2002 (JP) ..................................... 2002-012291

(51) Int. Cl.$^7$ ................................................ G11B 5/82

(52) U.S. Cl. ..................... 360/135; 360/97.01; 360/133; 428/141; 508/422

(58) Field of Search ...................... 360/97.01, 133, 360/135; 428/141; 508/422

(56) References Cited

U.S. PATENT DOCUMENTS 5,587,217 A * 12/1996 Chao et al. ................. 428/65.4
5,908,817 A * 6/1999 Perettie et al. .............. 508/422
6,605,335 B2 * 8/2003 Tani et al. ................... 428/141
6,730,403 B1 * 5/2004 Shirai et al. ................ 428/421

FOREIGN PATENT DOCUMENTS

| JP | 8-319491 | 12/1996 | ........ C10M/105/50 |
| JP | 10-143836 | 5/1998 | ............ G11B/5/66 |
| JP | 10-143839 | 5/1998 | ............ G11B/5/66 |
| JP | 2001-187796 | 7/2001 | ........... C07F/9/659 |

* cited by examiner

Primary Examiner—A. J. Heinz
(74) Attorney, Agent, or Firm—Antonelli, Terry, Stout & Kraus, LLP (57) ABSTRACT

A recording element or a reproducing element in a head generates heat that decomposes lubricating agent adhered to a slider surface near the recording/reproducing element of the head. This decomposed lubricating agent leads to corrosion of the magnetic layer and the like of the magnetic disk. The lubricating agent undergoes volume expansion due to this corrosion, creating a protrusion on the magnetic disk surface to which the lubricating agent is adhered. The magnetic disk surface to which the lubricating agent is adhered comes into contact with the magnetic head, leading to friction with the protective layer, the magnetic layer, and the like. In the worst case, this can lead to secondary errors where data recorded on the magnetic layer is erased. To prevent such secondary errors, the present invention provides a hard disk drive including:

a magnetic disk to which is applied a first lubricating agent formed as

-continued (where p = 0 or an integer of at least 1, q = 0 or an integer of at least 1, and X = 1–5)

or

HOCH$_2$CF$_2$(OC$_2$F$_4$)$_p$(OCF$_2$)$_q$OCF$_2$CH$_2$O —

(where p=0 or an integer of at least 1, q=0 or an integer of at least 1, and X=1–5); and a mechanism for supplying a second lubricating agent to the magnetic disk having an average molecular weight of no more than 2,400 and no less than 600 and formed as HOCH$_2$CF$_2$(OC$_2$F$_4$)$_p$(OCF$_2$)$_q$OCF$_2$CH$_2$OH (where p=0 or an integer of at least 1 and q=0 or an integer of at least 1).

14 Claims, 8 Drawing Sheets

HARD DISK DRIVE UTILIZING SECOND LUBRICANT OVER A FIRST LUBRICANT HAVING A PHOSOPHEZINE GROUP

CROSS-REFERENCES TO RELATED APPLICATIONS

This application is a continuation-in-part of U.S. application Ser. No. 09/897,401, filed Jul. 3, 2001 now U.S. Pat. No. 6,665,147, which claims priority from Japanese Patent Application No. 2000-208228, filed Jul. 5, 2000. This application is related to and claims priority from Japanese Patent Application No. 2002-12291, filed Jan. 22, 2002. The entire disclosures of these applications are incorporated herein by reference.

BACKGROUND OF THE INVENTION

The present invention relates to a hard disk drive that uses a magnetic recording medium in which at least a magnetic layer and a protective layer are formed on a magnetic disk substrate, and a liquid lubricating agent with a perfluoroether structure is applied to the surface thereof. The present invention also relates to a hard disk drive with a mechanism for supplying a lubricating agent into the device in the form of a gas.

The recording densities in hard disk drives has been steadily increasing at a significant rate. Recently, recording densities of 20 gigabits per square inch (Gbit/inch$^2$) have been announced. A requirement for achieving these high densities is to reduce the distance between the magnetic head and the magnetic recording layer of the magnetic disk as much as possible. Currently, this distance must be no more than 20 nm.

To reduce this distance as much as possible, the surface roughness of the magnetic disk must be reduced as much as possible. Therefore, there has been a transition from the contact start/stop (CSS) systems, where the magnetic head is in contact with the magnetic disk when the disk is not spinning and the magnetic head flies up due to air currents when the magnetic disk begins spinning, to load/unload (U/UL) systems, where the magnetic head is retracted away from the magnetic disk (unloaded) when the disk is stopped and is loaded on to the magnetic disk when the magnetic disk begins spinning. In U/UL systems, anti-sliding characteristics can be relaxed somewhat. However, the hard disk drive must be able to withstand impacts from load-on operations as well as sudden irregularities in head orientation that can occur even in normal operations.

Improvements in the protective layer and lubricating layer on magnetic disks are being made in order to minimize frication and damage caused by contact between the head and the magnetic disk. For example, in Japanese laid-open patent publication number Hei 8-319491, a perfluoro polyether with a phosphazene ring group is used in a lubricating agent to improve its properties. In Japanese laid-open patent publication number Hei 10-143836, a polyphenoxy cyclotriphosphazene is mixed with a perfluoro polyether at a weight ratio of 0.01–1. In Japanese laid-open patent publication number 2001-187796, a lubricating agent contains at least 30% perfluoro polyether having a phosophezene ring group. The object of these technologies is to improve wear resistance in magnetic disks, reduce head debris, reduce friction, reduce decomposition of the lubricating agent, or the like.

With regard to decomposition of the lubricating agent, it is believed that hydrogen fluoride (HF) is generated due to thermal decomposition from friction heat or decomposition due to Lewis acid, and that this HF causes a chain reaction that leads to decomposition of the lubricating agent. Japanese laid-open patent publication number Hei 10-143839 states that lubricating agents decompose due to exoelectrons generated by friction between the magnetic head and the magnetic disk.

Lubricating agents are supplied so that splattering of the lubricating agent due to rotation and heat can be reduced. In conventional technologies that supply lubricating agents to hard disk drives in the form of a gas, the lubricating agent supply source is placed within the head disk assembly. This conventional technology did not take into account the material and absorption properties of the supplied lubricating agent, the material and absorption properties of the lubricating layer formed on the magnetic disk, and the combinations of these elements. As a result, some lubricating agents are not able to prevent debris on the magnetic head, thus leading to reduced reliability. Furthermore, with some lubricating agents, corrosive outgas in the hard disk drive could generate a deposit on the magnetic head element that corrodes the metal in the element.

Also, absorption properties of the lubricating agent can vary depending on the type and characteristics of the protective layer of the magnetic disk. With diamond-like carbon (DLC) layers in particular, the absorption of the lubricating agent is less than that of carbon layers formed by sputtering, making it difficult to support the supplied lubricating agent on the magnetic disk and leading to reduced wear prevention.

SUMMARY OF THE INVENTION

When mixing two types of lubricating agents, e.g., a lubricating agent containing phosphazene and another lubricating agent, the combination must at least be evaluated based on compatibility, head debris, friction, and the like.

Magnetic heads used in magnetic disks are generally formed from a reproducing element that uses the Magneto-Resistive effect and a magnetic induction recording element. The recording element is formed from a coil generating a magnetic field and a magnetic pole that induces the magnetic field. The recording element records signals by sending a current of approximately a few dozen mA to the coil. The reproducing element receives a bias current. The reproducing element plays back signals by detecting changes in resistance resulting from the magnetic field. This bias current is between a few and a few dozen mA. Recording and reproducing frequencies increase with the recording density. With a 3.5 inch hard disk drive having a recording density of 20 Gbit/inch$^2$, the frequency reaches approximately 300 MHz. When recording at such high frequencies, the recording element generates heat due to electrical resistance and impedance resistance, becoming very hot. The heat that is generated depends on the element structure, but can reach 200–250 degrees Centigrade. Heat generation increases when the recording frequency increases. The reproducing element also generates heat in a similar manner. The layer thickness of the reproducing element is on the order of submicrons, and the track width decreases as the recording density increases. As a result, heat generation increases with higher recording densities.

Friction heat causes the lubricating agent of a magnetic disk to decompose. However, it has not been clearly pointed out that heat from the recording or reproducing element in the head leads to the decomposition of the lubricating agent on the slider surface near the recording/reproducing element of the head, resulting in reduced reliability in the hard disk drive. We have studied the causes of reduced reliability in hard disk drives and have discovered that reduced reliability is caused by decomposition and transfer of the lubricating agent due to heat from the recording and reproducing elements in the head.

This will be described in more detail. Lubricating agent adhered to the slider surface near the recording and reproducing elements is decomposed by heat from the recording or reproducing element. This creates hydrogen fluoride (HF), causing lubricating agent with a higher concentration of HF to be adhered to the magnetic disk surface. The lubricating agent adhered to the magnetic disk surface corrodes the magnetic layer and the like of the magnetic disk. As a result, a protrusion formed on the magnetic disk surface, which undergoes volume expansion due to this corrosion, is adhered. The magnetic disk surface forming the protrusion comes into contact with the magnetic head, leading to wear on the protective layer, the magnetic layer, and the like. In the worst case, this can lead to loss of data recorded on the magnetic layer, resulting in secondary errors in which data recorded on the magnetic layer is erased.

The present invention provides a hard disk drive that overcomes the loss of reliability in hard disk drives caused by these secondary errors.

More specifically, the present invention provides a hard disk drive including: a magnetic disk to which is applied a first lubricating agent formed as:

(where p = 0 or an integer of at least 1, q = 0 or an integer of at least 1, and X = 1–5)

or (where p=0 or an integer of at least 1, q=0 or an integer of at least 1, and X=1–5); a spindle motor spinning the magnetic disk; a magnetic head reading information recorded on the magnetic disk; an arm supporting the magnetic head; a voice coil motor positioning the arm on the magnetic disk; a circuit processing a signal read by the magnetic head; and a mechanism for supplying a second lubricating agent formed as:

(where p=0 or an integer of at least 1 and q=0 or an integer of at least 1) into the device.

According to another aspect, the present invention provides a hard disk drive including: a magnetic disk to which is applied a first lubricating agent formed as:

(where p = 0 or an integer of at least 1, q = 0 or an integer of at least 1, and X = 1–5)

or (where p=0 or an integer of at least 1, q=0 or an integer of at least 1, and X=1–5), and over which is applied a second lubricating agent formed as:

(where p=0 or an integer of at least 1 and q=0 or an integer of at least 1) into the device; a spindle motor spinning the magnetic disk; a magnetic head reading information recorded on the magnetic disk; an arm supporting the magnetic head; a voice coil motor positioning the arm on the magnetic disk; and a circuit processing a signal read by the magnetic head.

DESCRIPTION OF THE PREFERRED EMBODIMENTS

An example of the advantages of the present invention will be described using an embodiment. A glass substrate marketed for magnetic disks is suitable as a non-magnetic magnetic disk substrate. In order to reflect the surface roughness of a substrate surface, a magnetic disk medium which surface roughness (Ra) was approximately 0.8 nm, was prepared.

<Embodiment 1>

Figure 1:
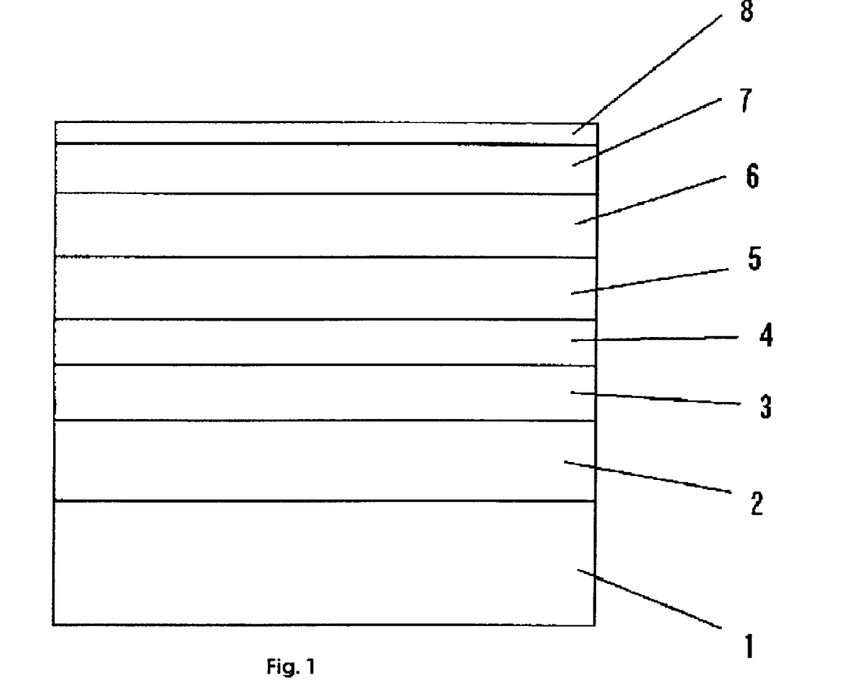
FIG. 1 is a simplified drawing showing a cross-section structure of a magnetic disk according to embodiment 1.

FIG. 1 is a simplified drawing of the layer structure of a magnetic disk according to embodiment 1. After washing a glass substrate 1, a disk sputtering device (Intevac Corp.'s MDP-250) is used to form a seed layer 2, a base layer 3, a lower magnetic layer 4, a non-magnetic intermediate layer 5, an upper magnetic layer 6, and a protective layer 7, as shown in the figure. The seed layer 2 is sputtered using a NiTa alloy target to form a layer that is approximately 30 nm thick. The thickness of the seed layer was measured using X-ray spectrometry. After it is formed, the seed layer is heated at approximately 260 degrees Centigrade and exposed for approximately 3.5 seconds to an Ar—$O_2$ gas. The CrTi alloy base layer 3 is formed over the seed layer 2 with a thickness of approximately 5 nm. The base magnetic layer is formed as a CoCrPt alloy magnetic layer with a thickness of approximately 3.5 nm. The intermediate layer is formed Ru layer with a thickness of approximately 0.5 nm. The upper magnetic layer 6 is formed as a CoCrPtB alloy layer with a thickness of approximately 15 nm. The protective layer 7 is formed with a thickness of approximately 3.5 nm over the upper magnetic layer 6. An example of this protective layer 7 is a DLC (diamond-like carbon) layer formed using CVD (chemical vapor deposition) or IBD (ion beam deposition). The thickness of the protective layer 7 is measured using X-ray reflection. To improve accuracy in the thickness measurement, quantizing is done by forming a 5 nm Cr layer over the protective layer 7. The X-ray reflection quantization of layer thickness was performed using Rigaku Denki Kogyo Corp.'s SLX2000TM with an $[CuK_{alpha1}]$ X-ray. Using Sumitomo-3M Corp.'s HFT7100 as a solvent, a lubricating agent solution as shown in chemical formula (1) was created. The magnetic disk was dipped into this lubricating agent solution to form the lubricating layer 8. The perfluoro polyether backbone chain in the lubricating agent based on chemical formula (1) has a number-average molecular weight of approximately 2,000. An FTIR measurement of the lubricating layer showed a thickness of approximately 1.5 nm.

Chemical formula (2)

COMPARATIVE EXAMPLE 1

A magnetic disk was created in a manner similar to that used in embodiment 1. However, a lubricating agent as shown in chemical formula (3) was used. Five types of lubricating agents were used, with number-average molecular weights of 1,000, 2,000, 3,000, 4,000, and 6,000, as measured using NMR (nuclear magnetic resonance). FTIR measurements of the lubricating layer thicknesses showed that each had a thickness of approximately 1.5 nm.

$HOCH_2CF_2(OC_2F_4)_p(OCF_2)_qOCF_2CH_2OH$  Chemical Formula (3)

(where p=0 or an integer of 1 or more and q=0 or an integer of 1 or more.)

Figure 2:
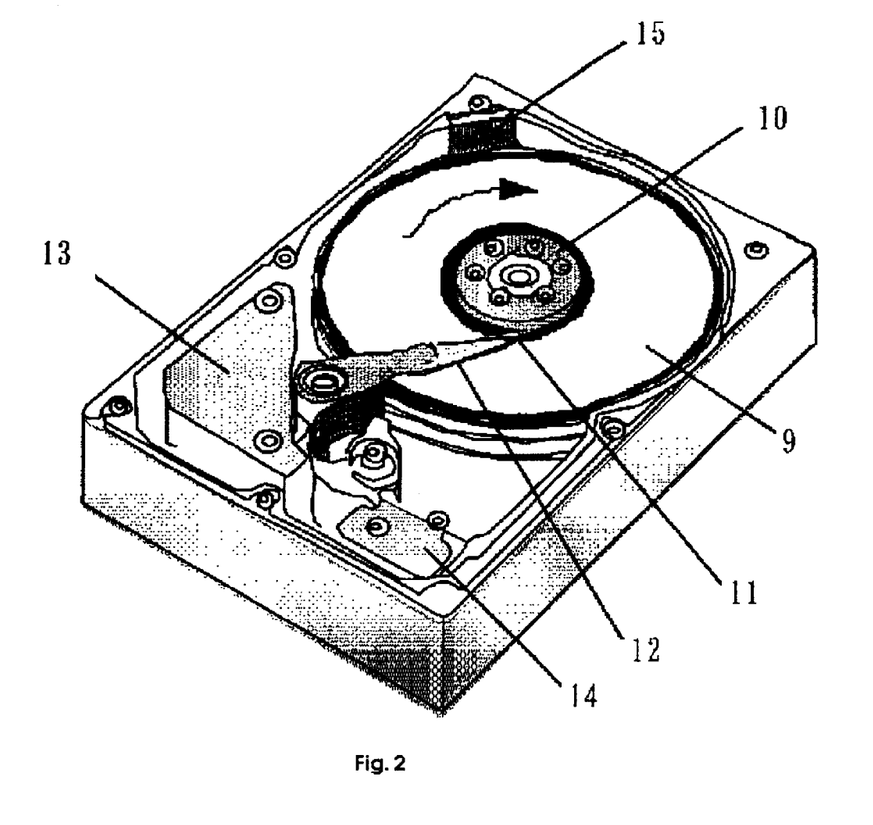
FIG. 2 is a simplified drawing of a structure of a magnetic disk.

The magnetic disks from embodiment 1, embodiment 2, and comparative example 1 were installed in a 3.5 inch hard disk drive (magnetic disk device). A simplified drawing of the hard disk drive is shown in FIG. 2.

The disk device includes: a spindle motor 10 for spinning a magnetic disk 9; an arm 12 for supporting a magnetic head 11 used to record information to the magnetic disk 9 and/or to read information recorded on the magnetic disk 9; a voice coil motor 13 for aligning the arm 12; a circuit 14 for processing information recorded on the magnetic disk 9 and read by the magnetic head 11 and information to be written to the magnetic disk 9; a mechanism for supplying the lubricating agent to the device (in this case, a dust filter 15); and the like. An approximately 1.0 mg drop of the lubricating agent indicated by chemical formula (3) and having a number-average molecular weight of 2,000 was applied to the dust filter 15, which was placed at a predetermined position to supply the lubricating agent to the device. The magnetic disks from the embodiments and the comparative examples were installed. The hard disk drive was operated at a speed of approximately 10,000 rpm (rotations per Chemical formula (1)

(where p=0 or an integer of 1 or more, q=0 or an integer of 1 or more, X=1–5.)

<Embodiment 2>

A magnetic disk was created in a manner similar to that used in embodiment 1. However, a lubricating agent as shown in chemical formula (2) was used. The perfluoro polyether backbone chain in the lubricating agent based on chemical formula (2) has a number-average molecular weight of approximately 2,000. An FTIR measurement of the lubricating layer showed a thickness of approximately 1.5 nm.

minute), with a recording density of approximately 20 Gbit/inch$^2$, a head flying height of approximately 15 nm, and a test environment temperature of approximately 50 degrees Centigrade.

The heads of the hard disk drive was fixed at a radial position of 38 mm so that they continuously followed a fixed recording track. The number of secondary errors was monitored, and the results are shown in FIG. 3.

Figure 3:
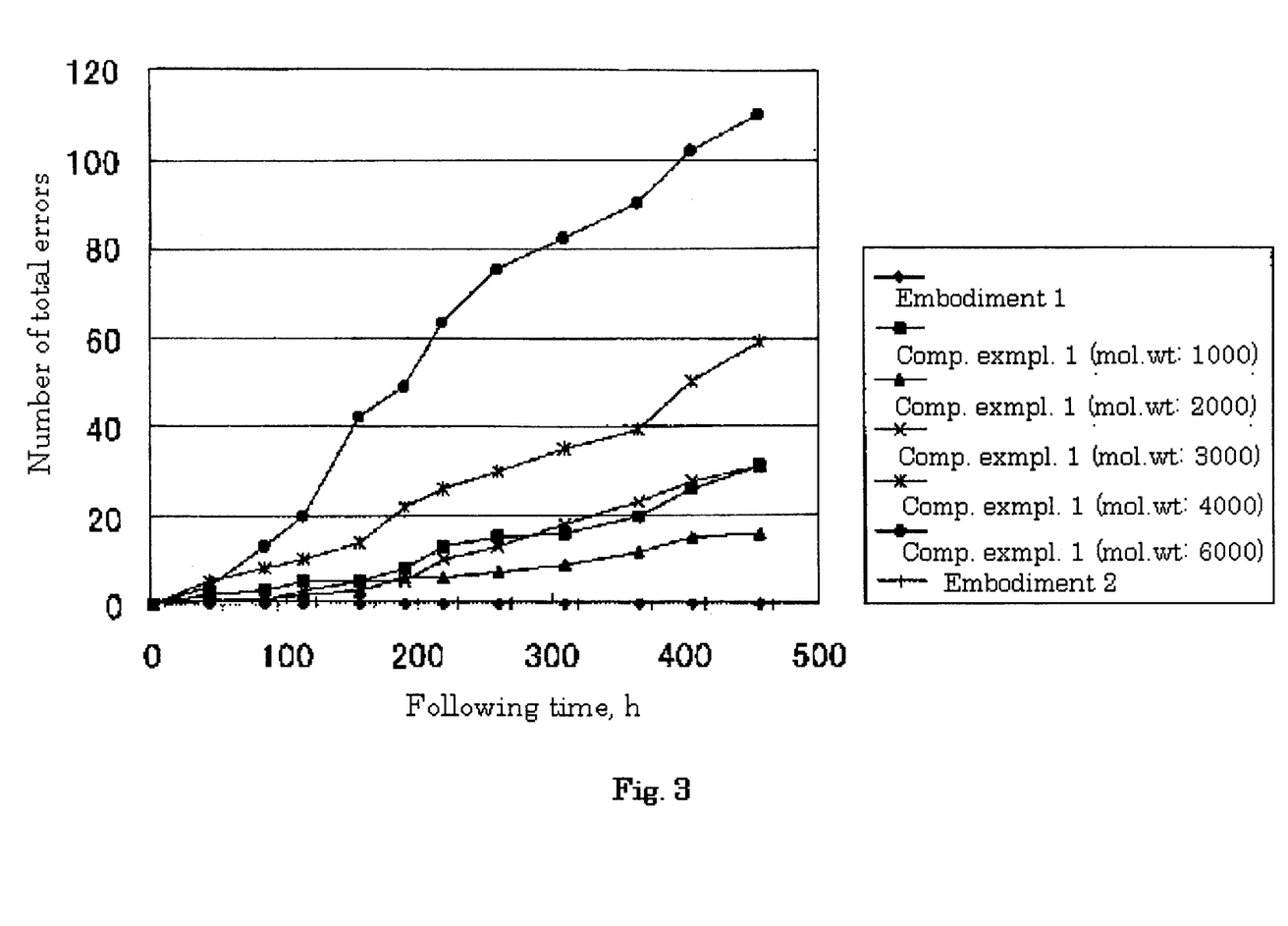
FIG. 3 is a drawing comparing numbers of secondary errors as they relate to following time in embodiments 1, 2 and comparative example 1.

As shown in FIG. 3, there were no secondary errors in embodiment 1 and embodiment 2. Thus, secondary errors were reduced and reliability was improved by applying perfluoro polyether lubricating agents having the molecular structures shown in chemical formula (1) and (2) to magnetic disks and using a hard disk drive equipped with a mechanism for supplying a lubricating agent shown in chemical formula (3) with a number-average molecular weight of 2,000. With comparative example 1, however, the number of secondary errors increased over time. As a result, it was found that secondary errors took place and the number increased over time when the same lubricating agent as shown in chemical formula (3) was applied to a magnetic disk.

Figure 4:
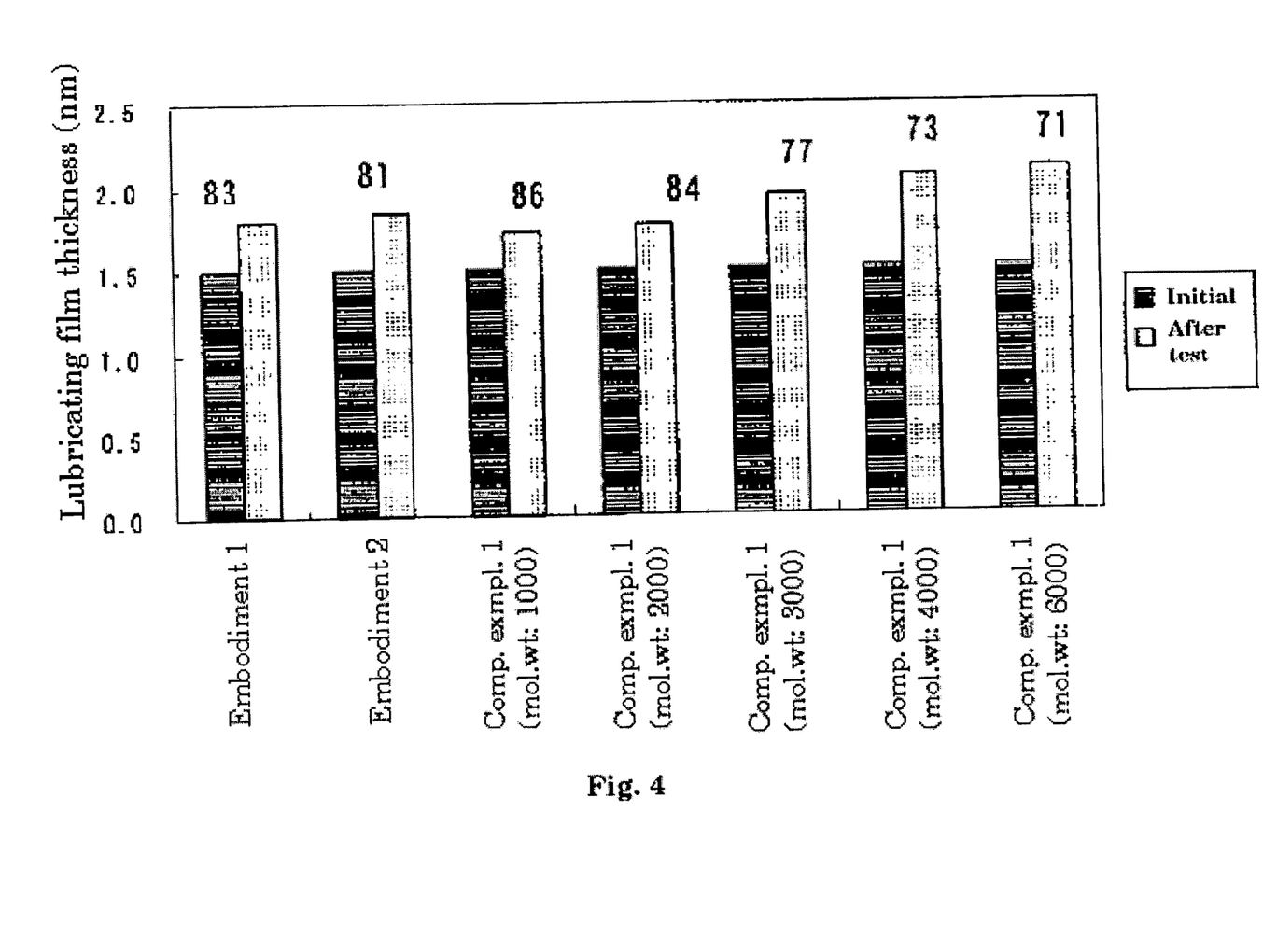
FIG. 4 is a drawing comparing lubricating layer thicknesses before and after a test in embodiments 1, 2 and comparative example 1.

This hard disk drive was taken apart after it was operated for 465 hours, and FTIR measurements were made of the lubricating layer thicknesses on the installed magnetic disks. FIG. 4 shows the changes in lubricating layer thickness before and after the test.

For example, the lubricating layer thickness of the magnetic disk from embodiment 1 was initially approximately 1.5 nm but increased to approximately 1.8 nm after the test. This indicates that the lubricating agent indicated by chemical formula (3) that was applied to the dust filter 15 adhered to the magnetic disk and increased the thickness. From this result, it can be postulated that the lubricating layer on the magnetic disk consists of approximately 1.5 nm of the lubricating agent indicated by the chemical formula (1) and approximately 0.3 nm of the lubricating agent indicated by the chemical formula (3). In this case, the lubricating agent from the chemical formula (1) would make up approximately 83% of the entire lubricating layer. The values shown in FIG. 4 show the proportions of lubricating agents on the magnetic disks before the test. After the test, the lubricating agent proportion was approximately 70–90% compared to before the test for embodiment 1, embodiment 2, and comparative example 1. These results show that the frequency of secondary errors can be reduced by forming the lubricating layer on the magnetic disk ahead of time as a mixture of the lubricating agents shown in chemical formula (1) and (2) and the lubricating agent shown in chemical formula (3) with a number-average molecular weight of 2,000, and by setting the proportion of the mixture to be the same as that of the lubricating layer after the test.

<Embodiment 3>

A magnetic disk was produced in the same manner as embodiment 2. An FTIR measurement showed that the lubricating layer had a thickness of approximately 1.5 nm. A drop of approximately 1.0 mg of lubricating agent as shown in chemical formula (3) with a number-average molecular weight of 1,000 was applied to the dust filter 15, which was placed at a predetermined position in a 3.5 inch hard disk drive. In another 3.5 inch hard disk drive, a drop of 1.0 mg of the lubricating agent with a number-average molecular weight of 1,000 was applied to the dust filter 15 placed at a predetermined position. The magnetic disk from embodiment 3 was installed in the hard disk drives. A test was conducted in a manner similar to those for embodiment 1 and 2.

COMPARATIVE EXAMPLE 2

A magnetic disk was created in a manner similar to that used in embodiment 3. However, a lubricating agent as shown in chemical formula (3) was used. Three types of lubricating agents were used, with number-average molecular weights of 3,000, 4,000, and 6,000, and 1.0 mg drops were applied to the dust filters 15 placed at predetermined positions in three hard disk drives, and the disks from the comparative example 2 were installed in these devices. A test was conducted in a manner similar to those for embodiment 1 and 2.

Figure 5:
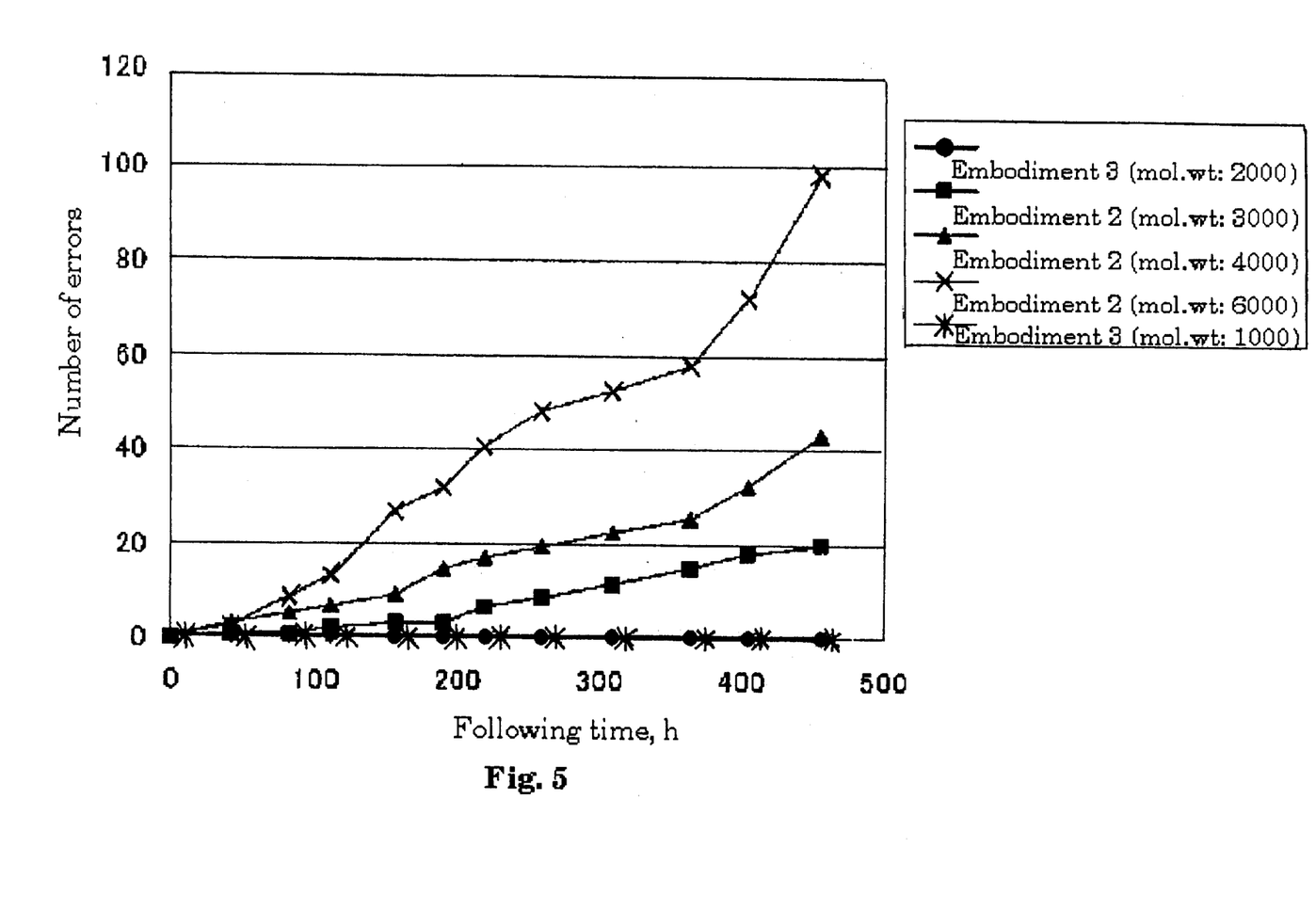
FIG. 5 is a drawing comparing the number of secondary errors as they relate to following time in embodiment 3 and comparative example 2.

FIG. 5 shows test results for the embodiment 3 and the comparative example 2.

Figure 6:
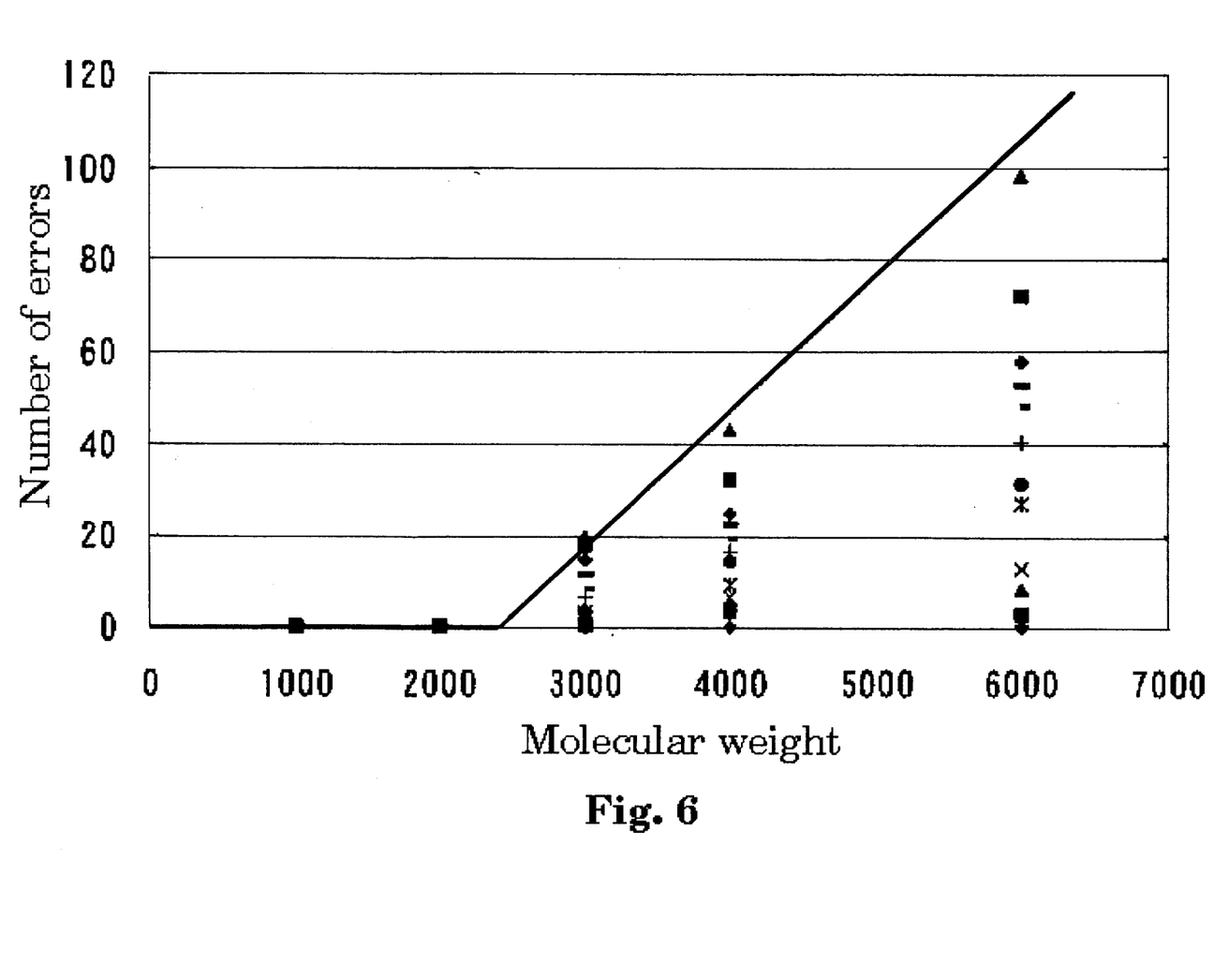
FIG. 6 is a drawing showing how the number of secondary errors depends on molecular weight.

These test results show that the frequency of secondary errors increases significantly as the molecular weight of the lubricating agent increases. FIG. 6 shows the results illustrated using the molecular weights of the lubricating agents as a parameter.

As FIG. 6 shows, secondary errors are less frequent with lower molecular weights. In particular, almost no secondary errors take place at molecular weights of 2,400 and less. Since a molecular weight that is too low can impede the function of the lubricating agent, e.g., because there is too much evaporation, so an average molecular weight of at least approximately 600 is preferable. Based on the test results for embodiments 1, 2, 3 and comparative examples 1, 2, a highly reliable hard disk drive can be achieved by supplying the hard disk drive with a lubricating agent as shown in chemical formula (3) and with a number-average molecular weights of at least approximately 600 and no more than approximately 2,400 and by forming the lubricating layer on the magnetic disks with a lubricating agent as shown in chemical formula (1) or chemical formula (2).

Next, the lubricating layer thickness of the hard disk drives from the embodiment 3 was measured after the test. It was found that the magnetic disk installed in the hard disk drive with the lubricating agent having a number-average molecular weight of 1,000 had a layer thickness of approximately 1.75 nm. The magnetic disk installed in the hard disk drive with the number-average molecular weight of 2,000 had a layer thickness of approximately 1.86 nm. As a result, it was determined that the proportions of the lubricating agent shown in chemical formula (2) were approximately 86% and 81% respectively. Thus, it is believed that few secondary errors take place in magnetic disks with lubricating layers formed by mixing a lubricating agent from chemical formula (1) or (2) with a lubricating agent from chemical formula (3) with a number-average molecular weight of approximately 600–2,400.

<Embodiment 4>

Magnetic disks were made in a manner similar to that of embodiment 2. However, the lubricating layer thicknesses were set to 1.0, 1.2, 1.5, and 1.8 nm.

<Comparative Embodiment 3>

Magnetic disks were made in a manner similar to that of embodiment 2. However, the lubricating layer thicknesses were set to 0.4, 0.6, and 0.8 nm.

Two types of 3.5-type hard disk drives were prepared, one in which a 1.0 mg drop of lubricating agent as shown in chemical formula (3) with a number-average molecular weight of 1,000 was applied to the dust filter 15 placed at a predetermined position in the device, the other in which a 1.0 mg drop of lubricating agent as shown in chemical formula (3) with a number-average molecular weight of 2,000 was applied to the dust filter 15 placed at a predetermined position in the device. The magnetic disks from the embodiment 4 and the comparative example 3 were installed in these hard disk drives. The hard disk drive was operated at a speed of approximately 10,000 rpm, with a recording density of approximately 20 Gbit/inch$^2$, a head flying height of approximately 15 nm, and a test environment temperature of approximately 50 degrees Centigrade. A test was performed 500 hours and the numbers of secondary errors were compared. Also, the lubricating layer thicknesses before and after the test were compared.

Figure 7:
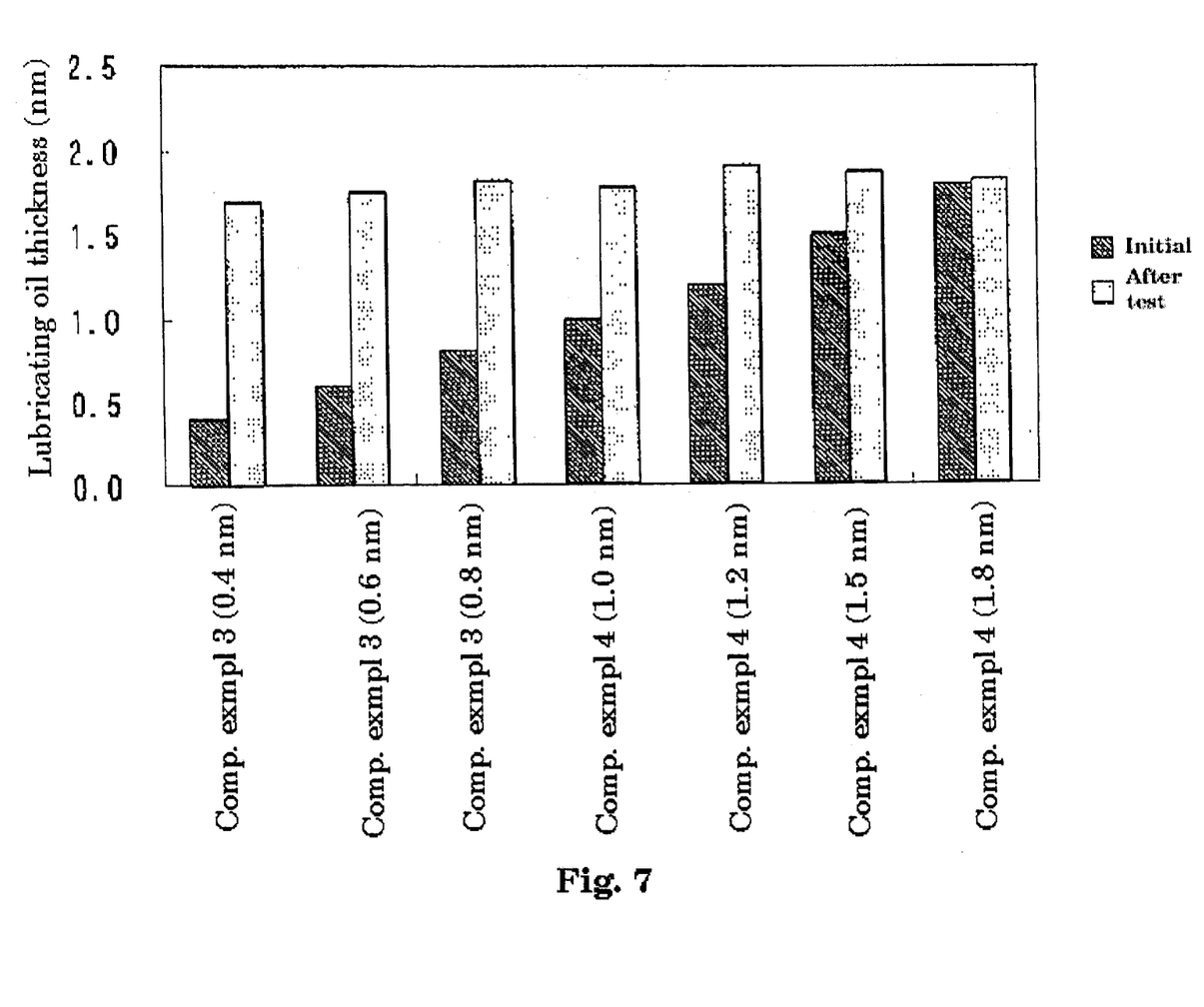
FIG. 7 is a drawing comparing lubricating layer thicknesses before and after a test in embodiment 4 and comparative example 3.
Figure 8:
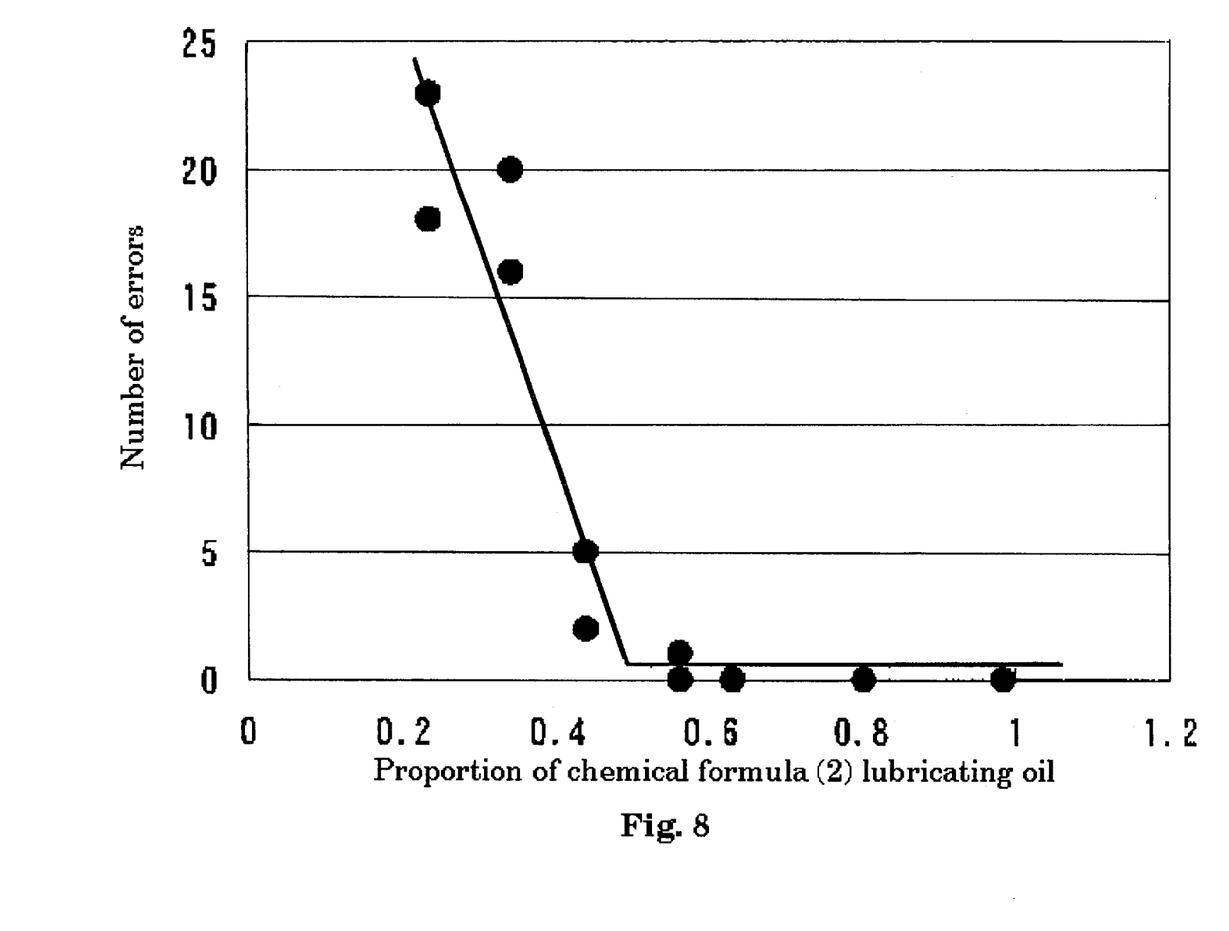
FIG. 8 is a drawing showing the relationship between the proportion of chemical formula (1) and secondary errors.

FIG. 7 shows lubricating layer thickness comparisons from before and after the test. FIG. 8 shows the relationship between the proportion of the lubricating agent shown in chemical formula (2) in the lubricating layer after the test and the number of secondary errors.

FIG. 7 shows that the lubricating layer thicknesses increased after the test. The thicknesses were not dependent on the initial lubricating layer thickness and were about 1.8 nm. The samples with lower initial layer thicknesses had smaller proportions of the lubricating agent from chemical formula (2). Also, FIG. 8 shows that there were no secondary errors when the proportion of the chemical formula (2) was approximately 50% or less, i.e., the proportion of the lubricating agent from the chemical formula (3) was approximately 50% or more. In other words, it was found that there were no secondary errors if the proportion of the lubricating agent from the chemical formula (3) was less than the proportion of the lubricating agent from the chemical formula (2). Based on these results, a highly reliable hard disk drive with no secondary errors can be achieved with a lubricating layer containing a lubricating agent shown in chemical formula (1) or chemical formula (2) and a lubricating agent shown in chemical formula (3), where the average molecular weight is at least approximately 600 and no more than approximately 2,400 and the proportion of the lubricating agent shown in chemical formula (3) is no more than approximately 50%.

Looking at these points from another perspective, this means that secondary errors do not take place if the initial layer thickness is at least approximately 1.0 nm. The test results show that the thickness of the lubricating layer from chemical formula (3) together with the lubricating agent from chemical formula (1) or (2) tends to not go over approximately 1.8 nm. In other words, applying a lubricating agent from chemical formula (1) or (2) at a thickness of more than approximately 1.8 nm may prevent the lubricating agent from chemical formula (3) from being adhered. Thus, it would be preferable for the lubricating agent from chemical formula (1) or (2) to be approximately 1.0 nm–1.8 nm.

Comparative Example 4

A magnetic disk was made in a manner similar to that of embodiment 1. However, a lubricating agent applied to the magnetic disk is formed approximately 70% from a lubricating agent shown in chemical formula (2) and approximately 30% from a lubricating agent shown in chemical formula (4) with an average molecular weight of 3,000. The lubricating agent layer thickness was approximately 1.5 nm. This magnetic disk was installed in a magnetic disk with a mechanism for supplying a lubricating agent with an average molecular weight of 2,000. A following test was performed and secondary errors were studied.

[As a result, after 500 hours of testing, there were 24 errors, thus showing decreased reliability compared to the magnetic disks from the embodiments. Thus, it is believed that secondary errors do not take place when chemical formula (1) or (2) and chemical formula (3) with an average molecular weight of approximately 600–2,400 are combined in the lubricating agent and when the proportion of the lubricating agent from chemical formula (1) or (2) is at least approximately 50%.

In the lubricating agents applied to the magnetic disks in the embodiments, the molecular weight of the backbone chain of the lubricating agent shown in chemical formula (1) or (2) was 2,000. However, the present invention is not restricted to this molecular weight, and similar advantages can be obtained if the lubricating agent has an average molecular weight in the range of 1,500–6,500. In general, aggregation in the lubricating layer decreases with higher molecular weights in the lubricating agent, so a high molecular weight of about 3,500–5,500 is believed to be suitable for stable head flight.

As indicated by the embodiments, a magnetic disk that uses a mixed lubricating layer combining a lubricating agent as shown in chemical formula (1) or (2) with a lubricating agent shown in chemical formula (3) with an average molecular weight of 600–2400, with the proportion of the lubricating agent shown in chemical formula (3) being at least 50%, works well with a hard disk drive with a mechanism for supplying a lubricating agent as shown in chemical formula (3) with an average molecular weight of 600–2,400. The reliability of the resulting hard disk drive is significantly improved.

A magnetic disk with an ultrathin-layer protecting layer with a layer thickness of 1.0–5.0 nm according to the present invention provides superior recording/reproducing performance, dust resistance, and wear resistance.

What is claimed is:

1. A hard disk drive comprising:
a magnetic disk to which is applied a first lubricating agent formed as:

(where p = 0 or an integer of at least 1, q = 0 or an integer of at least 1, and X = 1–5)

or (where p=0 or an integer of at least 1, q=0 or an integer of at least 1, and X=1–5);

a spindle motor spinning the magnetic disk;

a magnetic head reading information recorded on the magnetic disk;

an arm supporting the magnetic head;

a voice coil motor positioning the arm on the magnetic disk;

a circuit processing a signal read by the magnetic head; and a mechanism for supplying a second lubricating agent formed as:

(where p=0 or an integer of at least 1 and q=0 or an integer of at least 1).

2. A hard disk drive as described in claim 1 wherein an average molecular weight of the second lubricating agent is no more than 2,400 and no less than 600.

3. A hard disk drive as described in claim 1 wherein the mechanism for supplying the second lubricating agent into the device is a dust filter.

4. A hard disk drive as described in claim 1 wherein the first lubricating agent is applied with a thickness in a range of approximately 1.0–1.8 nm.

5. A hard disk drive as described in claim 1 wherein the average molecular weight of the first lubricating agent is roughly in a range of 1,500–6,500.

6. A hard disk drive as described in claim 1 wherein the average molecular weight of the first lubricating agent is roughly in a range of 3,500–6,500.

7. A hard disk drive as described in claim 1 wherein the magnetic disk is formed by stacking a glass substrate, a seed layer, a base layer, a lower magnetic layer, a non-magnetic intermediate layer, an upper magnetic layer, and a protective layer.

8. A hard disk drive comprising:

a magnetic disk to which is applied a first lubricating agent formed as:

(where p = 0 or an integer of at least 1, q = 0 or an integer of at least 1, and X = 1–5)

or (where p=0 or an integer of at least 1, q=0 or an integer of at least 1, and X=1–5), and over which is applied a second lubricating agent formed as:

$$HOCH_2CF_2(OC_2F_4)_p(OCF_2)_qOCF_2CH_2OH$$

(where p=0 or an integer of at least 1 and q=0 or an integer of at least 1);

a spindle motor spinning the magnetic disk;

a magnetic head reading information recorded on the magnetic disk;

an arm supporting the magnetic head;

a voice coil motor positioning the arm on the magnetic disk; and a circuit processing a signal read by the magnetic head.

9. A hard disk drive as described in claim 8 wherein an average molecular weight of the second lubricating agent is no more than 2,400 and no less than 600.

10. A hard disk drive as described in claim 8 wherein a proportion of the second lubricating agent is less than that of the first lubricating agent.

11. A hard disk drive as described in claim 8 wherein the first lubricating agent is applied with a thickness in a range of approximately 1.0–1.8 nm.

12. A hard disk drive as described in claim 8 wherein the average molecular weight of the first lubricating agent is roughly in a range of 1,500–6,500.

13. A hard disk drive as described in claim 8 wherein the average molecular weight of the first lubricating agent is roughly in a range of 3,500–6,500.

14. A hard disk drive as described in claim 8 wherein the magnetic disk is formed by stacking a glass substrate, a seed layer, a base layer, a lower magnetic layer, a non-magnetic intermediate layer, an upper magnetic layer, and a protective layer.

* * * * *